(12) United States Patent
Nießing

(10) Patent No.: US 11,345,333 B2
(45) Date of Patent: May 31, 2022

(54) HYBRID MOTOR VEHICLE AND METHOD FOR OPERATING A HYBRID MOTOR VEHICLE

(71) Applicant: AUDI AG, Ingolstadt (DE)

(72) Inventor: Henning Nießing, Bad Friedrichshall (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/318,165

(22) Filed: May 12, 2021

(65) Prior Publication Data

US 2022/0017068 A1 Jan. 20, 2022

(30) Foreign Application Priority Data

Jul. 17, 2020 (DE) .......................... 102020118924.9

(51) Int. Cl.
*B60W 10/06* (2006.01)
*B60W 20/40* (2016.01)
(Continued)

(52) U.S. Cl.
CPC ............... *B60W 20/40* (2013.01); *B60K 6/26* (2013.01); *B60K 6/28* (2013.01); *B60K 6/387* (2013.01);
(Continued)

(58) Field of Classification Search
CPC .... B60W 20/40; B60W 10/024; B60W 10/06; B60W 10/08; B60W 2510/244;
(Continued)

(56) References Cited

U.S. PATENT DOCUMENTS

2016/0264140 A1\* 9/2016 Matsushita ........... B60W 20/40
2017/0259803 A1\* 9/2017 Khafagy ............... B60W 20/13
(Continued)

FOREIGN PATENT DOCUMENTS

DE 10246835 A1 4/2003
DE 60301516 T2 6/2006
(Continued)

OTHER PUBLICATIONS

German Examination Report dated Mar. 31, 2021 in corresponding German Application No. 102020118924.9; 12 pages; Machine translation attached.

*Primary Examiner* — David J Hlavka
(74) *Attorney, Agent, or Firm* — Maier & Maier, PLLC

(57) ABSTRACT

A hybrid motor vehicle including an internal combustion motor and an electric drive motor as drive motors in a powertrain, wherein the electric drive motor and a high-voltage battery associated therewith are connected to a high-voltage network of the hybrid motor vehicle, wherein the hybrid motor vehicle moreover includes at least one air conditioning system with an air conditioning compressor with which an electric motor for operating the air conditioning compressor from the high-voltage network is associated, wherein the electric motor, forming an auxiliary unit arrangement, is connected via a first clutch to the air conditioning compressor and via a second clutch to a belt drive of the internal combustion motor and can be operated in order to charge the high-voltage battery. A control device is provided for actuating at least one of the clutches as a function of a current operating state of the hybrid motor vehicle.

11 Claims, 1 Drawing Sheet

(51) Int. Cl.
- *B60K 6/26* (2007.10)
- *B60K 6/28* (2007.10)
- *B60L 1/00* (2006.01)
- *B60K 6/387* (2007.10)
- *B60L 15/20* (2006.01)
- *B60W 10/08* (2006.01)
- *B60W 10/02* (2006.01)
- *F16D 65/14* (2006.01)

(52) U.S. Cl.
CPC ................ *B60L 1/00* (2013.01); *B60L 15/20* (2013.01); *B60W 10/024* (2020.02); *B60W 10/06* (2013.01); *B60W 10/08* (2013.01); *F16D 65/14* (2013.01); *B60W 2510/244* (2013.01); *B60W 2710/021* (2013.01); *B60Y 2200/92* (2013.01)

(58) Field of Classification Search
CPC ..... B60W 2710/021; B60K 6/26; B60K 6/28; B60K 6/387; B60L 1/00; B60L 15/20; F16D 65/14

See application file for complete search history.

(56) References Cited

U.S. PATENT DOCUMENTS

| 2019/0184964 A1* | 6/2019 | Murakami | ............ B60W 20/10 |
| 2019/0270383 A1* | 9/2019 | Murakami | .............. B60L 50/16 |

FOREIGN PATENT DOCUMENTS

| DE | 102005022210 A1 | 11/2006 |
| DE | 102008036167 A1 | 2/2010 |
| DE | 102012203576 A1 | 3/2013 |
| DE | 102013013541 B3 | 12/2014 |

* cited by examiner

HYBRID MOTOR VEHICLE AND METHOD FOR OPERATING A HYBRID MOTOR VEHICLE

FIELD

The invention relates to a hybrid motor vehicle, comprising an internal combustion motor and an electric drive motor as drive motors in a powertrain, wherein the electric drive motor and a high-voltage battery associated therewith are connected to a high-voltage network of the hybrid motor vehicle, wherein the hybrid motor vehicle moreover comprises at least one air conditioning system with an air conditioning compressor with which an electric motor for operating the air conditioning compressor from the high-voltage network is associated. The invention further relates to a method for operating such a hybrid motor vehicle.

BACKGROUND

Hybrid motor vehicles are already known in the prior art and are characterized in that they comprise at least two drive motors, namely a conventional internal combustion motor which is operated, for example, via fuel from a tank, and an electric drive motor which uses electric energy stored in a high-voltage battery for operating. Such electric drive motors usually are also generatively driven, for example, in order to be able to charge the high-voltage battery (recovery). In hybrid motor vehicles, a distinction can be made, for example, between plug-in hybrids, in which the high-voltage battery can be charged via a charging device in the motor vehicle, and so-called mild hybrids.

If air conditioning compressors are used in such hybrid motor vehicles, in particular as component of an air conditioning system, they can be conventionally driven via a belt drive of the internal combustion motor, that is to say indirectly via the internal combustion motor, or else as high-voltage air conditioning compressors which are separate from the belt drive and driven by their own electric motor supplied from the high-voltage network. While in the first-described case, operation in a hybrid motor vehicle is only possible when the internal combustion motor is also operated, in the second case there are always problems when the charging state of the high-voltage battery becomes too low. In particular, there is then also a risk of continuing discharging of the high-voltage battery, which is disadvantageous for the electric operating range. In other words, the second variant only allows cooling of the interior in the case of a sufficiently charged high-voltage battery. On the other hand, charging of the high-voltage battery, in particular when the idling motor vehicle is stationary, is then not possible, since the electric drive motor is then usually uncoupled.

Therefore, the situation just described only allows operation of the air conditioning compressor with running internal combustion motor or when the high-voltage battery provides sufficient power for the electric motor of the air conditioning compressor.

For conventional motor vehicles, for example, in DE 10 2008 036 167 A1, an auxiliary unit arrangement for a motor vehicle internal combustion motor is proposed, which allows low fuel consumption in a simple design. Here it is provided that, between the air conditioning compressor and the starter generator, a switchable intermediate clutch is provided, by means of which a reaction of the air conditioning compressor to the starter generator can be switched off. Furthermore, an additional switchable input clutch between the starter generator and the internal combustion motor is provided. DE 603 01 516 T2 relates to a motor vehicle air conditioning system, in which a compressor is connected to a machine for driving the vehicle, wherein a connection between the mentioned machine and the mentioned compressor is released in response to stopping of the mentioned machine, and, for driving the mentioned compressor, an electric motor is connected to the mentioned compressor in response to the stopping of the mentioned machine.

The underlying problem of the invention is to indicate an improved connection of an air conditioning compressor in a hybrid motor vehicle.

SUMMARY

In order to solve this problem, in a hybrid motor vehicle of the type mentioned at the start, it is provided according to the invention that the electric motor, forming an auxiliary unit arrangement, is connected via a first clutch to the air conditioning compressor and via a second clutch to a belt drive of the internal combustion motor and can be operated in order to charge the high-voltage battery, wherein a control device is provided for actuating at least one of the clutches, in particular the entire auxiliary unit arrangement, as a function of a current operating state of the motor vehicle.

The auxiliary unit arrangement which is formed, in addition to the electric motor, thus comprises the first clutch, the air conditioning compressor, the second clutch, and the belt drive. An actuation as a function of the operating state can here be understood to mean in particular that the control device uses at least two operating modes with correspondingly associated usage criteria, wherein, when the usage criteria for an operating mode are met, the associated operating mode is selected and used. Here, the usage criteria can evaluate at least one operating parameter of the hybrid motor vehicle describing the operating state of the motor vehicle, in particular at least one operating parameter of the powertrain and/or of the high-voltage network, in particular of the high-voltage battery, and/or of the air conditioning system. In particular, the air conditioning compressor is only operated here if this is also necessary in order to achieve the desired air conditioning effect, which is specified in particular by the user. The control device is here preferably designed to actuate the entire auxiliary unit arrangement, wherein, in addition to this, it can also be used for actuating additional components of the motor vehicle, for example, it can be used at least partially for controlling the operation of the air conditioning system and/or for at least partially controlling the operation of the high-voltage network and the connected components. For this purpose, the control device can in particular also communicate with other control devices, in particular control units, of the motor vehicle, for example, in order to receive information relating to the air conditioning compressor and/or charging instructions to be executed in the high-voltage network.

By including the air conditioning compressor which can be operated from the high-voltage network in the belt drive of the internal combustion motor, the air conditioning compressor can operated either directly by the internal combustion motor or by the high-voltage battery via the electric motor. This means that the air conditioning compressor can be considered to be a hybrid air conditioning compressor. In this configuration, it is likewise possible to use the electric motor of the air conditioning compressor as generator, and, in particular, to recharge the high-voltage battery, in particular in the stationary or idling state, which so far has been found to be problematic in the hybrid motor vehicle. The auxiliary unit arrangement accordingly comprises two clutches, namely a first clutch which enables a coupling of the electric motor to the air conditioning compressor, and a second clutch which can separate both the air conditioning compressor and the electric motor from the belt drive. Thus, on the one hand, the air conditioning compressor can be coupled only to the electric motor for the purely electric operation, so that only the first clutch is closed, while the second clutch is open. However, the second clutch can also be closed, so that the air conditioning compressor is operated both by the electric motor and by the internal combustion motor, which supplies additional torque so to speak. However, in the same manner, it can be provided that the air conditioning compressor is operated just via the internal combustion motor, when the two clutches are closed, wherein by a corresponding actuation the electric motor in the process can be brought into a state in which its braking action is reduced as much as possible, that is to say is bypassed so to speak. This can occur, for example, by switching the windings of the electric motor into a high-ohm state. In this way, the belt drive can be used alone for operating the air conditioning compressor. However, in such an operating state, in which the two clutches are closed, it is also conceivable, as will be explained in further detail, to tap power via the electric motor in generative operation and use it to charge the high-voltage battery, so that even when the air conditioning compressor is operated, the high-voltage battery can nevertheless be charged when the hybrid vehicle is stationary or when the internal combustion motor is idling. In order to make this possible even more efficiently, the power can be used entirely for charging the high-voltage battery, when the air conditioning compressor is not needed, by opening the first clutch and with the second clutch closed.

Thus, by means of the present invention, it is possible in a particularly simple manner, using just one component—the electric motor of the air conditioning compressor—when the hybrid motor vehicle is stationary, to enable both charging of the high-voltage battery and also air conditioning of the interior of the motor vehicle, wherein in addition it is also possible to operate the air conditioning compressor from the high-voltage network. This is a clearly more cost effective implementation than the use of an additional motor generator, multiple air conditioning compressors and the like. Moreover, the belt drive can also be designed extremely simply, since, in the end, it just needs to drive the auxiliary unit arrangement, since additional alternators and the like are dispensed with. This in turn leads to savings in terms of cost and installation space.

In summary, various operating states can be represented by different operating modes and corresponding actuation of the auxiliary unit arrangement without an additional generator or an alternator on the internal combustion motor being necessary. In addition, in this variant, the use of a conventional air conditioning compressor can also be dispensed with. For the first time, it is made possible, in a simple, integrative manner, including while the hybrid motor vehicle is stationary, when no electrical power can be generated via the electric drive motor, both to charge the high-voltage battery and to operate the air conditioning compressor, even in a low charging state of the high-voltage battery, in order to create a comfortable temperature in the interior of the hybrid motor vehicle. This is extremely advantageous, particularly in situations with frequent stationary phases of the hybrid motor vehicle, for example, in congestion situations or shortly after starting to drive in inner city traffic with traffic lights, as well as in similar driving situations.

More concretely, the control device for actuating the clutches can be designed for the following operating modes:
- a first operating mode, in which the first clutch is closed, and the second clutch is open, so that the air conditioning compressor can be operated via the electric motor from the high-voltage network,
- at least one second operating mode, in which the first clutch and the second clutch are closed, so that the air conditioning compressor can be operated by the belt drive, and
- at least one third operating mode, in which the first clutch is open and the second clutch is closed, so that the high-voltage battery can be charged without operation of the air conditioning compressor by the belt drive.

In particular with regard to the at least one second and the at least one third operating mode, various concrete designs are conceivable, as can be seen, for example, in that in at least one of the at least one second operating mode, which is then referred to as hybrid drive mode, the power obtained from the drive belt can be used simultaneously for charging the high-voltage battery and for operating the air conditioning compressor, or, in at least one of the at least one second operating mode, the air conditioning compressor is operated both by the internal combustion motor and from the high-voltage network. It is likewise true of the at least one third operating mode that, for example, in at least one of the at least one third operating mode, the electric motor of the auxiliary unit arrangement does not necessarily have to be operated generatively but instead can also contribute assistance to the driving of the motor vehicle, for example, in order to provide a boost.

Advantageously, the control device can be designed for the use of the first operating mode when the internal combustion motor is not operated and/or when a charging state of the high-voltage battery exceeds a threshold value. Correspondingly, the control device is designed for the use of the at least one second operating mode and/or of the at least one third operating mode when the internal combustion motor is operating, in particular while idling and/or while the hybrid motor vehicle is stationary. Here, use of at least the designs of the second and of the third operating modes in which the high-voltage battery is charged while the hybrid motor vehicle is stationary, as presented, should be rated as particularly advantageous.

As already mentioned, a particularly advantageous development of the present invention provides that, in a hybrid operating mode in which the first clutch and the second clutch are closed, that is to say in particular in at least one of the at least one second operating mode, the control device, for operating the auxiliary unit arrangement, is designed for the simultaneous use of the energy obtained from the belt drive for charging the high-voltage battery by generative operation of the electric motor and for operating the air conditioning compressor. In hybrid motor vehicles, while a hybrid motor vehicle is stationary, this also makes it possible both to operate the air conditioning compressor and to recharge a high-voltage battery, which can be particularly advantageous, particularly in hybrid motor vehicles without the possibility of charging from a power network (so-called mild hybrids), if a certain charging state of the high-voltage battery is to be brought about or maintained, even in operating phases in which the motor vehicle is frequently stationary and therefore the electric drive motor does not deliver generative power. Moreover, as indicated, an additional second operating mode is conceivable, in which both the electric motor and the drive belt contribute to the operation of the air conditioning compressor, which can be advantageous, for example, in high load situations for the air conditioning, which accordingly can be detected as operating state of the motor vehicle.

Furthermore, in the context of the present invention, it is advantageous if, in a boost operating mode with closed second clutch and in particular with open first clutch, the control device is designed for motor-driven operation of the electric motor in order to provide a boost torque for driving the hybrid motor vehicle. This means that the particular proposed configuration results in an additional advantageously usable operating mode, in particular as at least one of the at least one third operating mode, for a hybrid motor vehicle, in which assistance of the driving of the motor vehicle by the electric motor of the air conditioning compressor is also allowed, in particular without the air conditioning compressor itself hindering this.

At this point, it should be mentioned again here that the first and the second clutches in the end can be implemented as desired, that is to say in particular as mechanical or preferably electromagnetic clutches. For example, the first clutch and/or the second clutch can be designed as magnetic particle clutches and/or friction clutches and/or pulse-controlled friction clutches. It can be shown that clutches in which the slippage can be controlled, for example, via an applied voltage, are particularly advantageous, since a power distribution can then take place or be assisted.

BRIEF DESCRIPTION OF THE FIGURES

Additional advantages and details of the present invention result from the embodiment examples described below and in reference to the drawing. Here.

DETAILED DESCRIPTION

Figure 1:
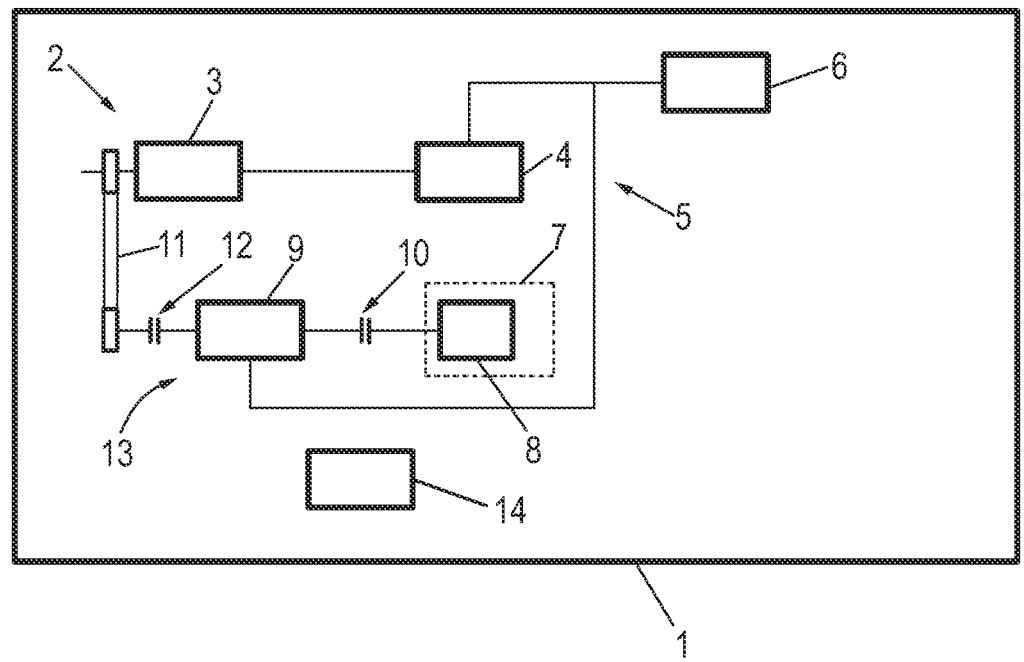
FIG. 1 shows a schematic diagram of a hybrid motor vehicle according to the invention.

FIG. 1 shows a schematic diagram of a hybrid motor vehicle 1 according to the invention.

Said hybrid motor vehicle comprises a powertrain 2 which is only indicated here and which comprises an internal combustion motor 3 and an electric drive motor 4 as drive motors. The electric drive motor 4 is connected to a high-voltage network 5 to which a high-voltage battery 6 is also connected. The high voltage of the high-voltage network 5 can here be higher than 50 V, in particular higher than 200 V, for example, 450 V.

The motor vehicle 1 furthermore comprises an air conditioning system 7 which is only indicated, with an air conditioning compressor 8 with which an electric motor 9 is associated. The electric motor 9 is also connected to the high-voltage network 5 and can be uncoupled via a first clutch 10 from the air conditioning compressor 8 as desired.

Also associated with the internal combustion motor 3 is a belt drive 11 which can be coupled via a second clutch 12 to the electric motor 9 and the air conditioning compressor 8. The belt drive 11, the second clutch 12, the electric motor 9, the first clutch 10, and the air conditioning compressor 8 form an auxiliary unit arrangement 13 which can be controlled via a control unit 14, wherein, in particular in different operating modes which are selected as a function of operating states of the hybrid motor vehicle 1, different positions of the first and of the second clutches 10, 12 are used.

In a first operating mode, the first clutch 10 is closed and the second clutch 12 is open, so that the air conditioning compressor 8 is coupled to the electric motor 9 but none of these components is connected to the belt drive 11. The air conditioning compressor 8 can thus be operated from the high-voltage network 5 via the electric motor 9. This first operating mode can be used, for example, when the operation of the air conditioning compressor 8 is necessary for sufficiently cooling the interior by means of the air conditioning system 7, when the internal combustion motor 3 is in any case not operated and when the charging state of the high-voltage battery 6 is sufficiently high.

Second operating modes which can be used by the control device 14 are defined in that the first clutch 10 and the second clutch 12 are both closed. This enables various usage scenarios which can be represented by different second operating modes. On the one hand, it is possible to operate the air conditioning compressor 8 with the power provided by the belt drive 11, wherein the electric motor 9 is then connected in a corresponding mode which does not tap power to the extent possible. The electric motor 9 can then be "bypassed," for example. However, in hybrid motor vehicles, when the motor vehicle 1 is stationary, the problem exists that charging of the high-voltage battery 6 is not possible, which, in particular in traffic situations or operating phases in which the hybrid motor vehicle 1 is often stationary, can have a negative effect on the charging state of the high-voltage battery 6, in particular in so-called mild hybrids, in which the hybrid motor vehicle 1 cannot be charged at a charging unit outside of the motor vehicle. In such situations, when operation of the air conditioning compressor 8 is also necessary, a power distribution can then advantageously occur, distributing the power provided by the internal combustion motor 3 via the belt drive 11 to the generatively operated electric motor 9 and the air conditioning compressor 8, so that operation of the air conditioning compressor 8 and charging of the high-voltage battery 6 are simultaneously enabled.

At this point, it should also be noted that the hybrid motor vehicle 1 can have a low-voltage network (on-board power supply), not represented in further detail here for the sake of clarity, for example, at 12 V, with which a battery, therefore an on-board power supply battery, can also be associated. Such an on-board power supply battery can in principle be charged indirectly or directly via the electric motor 9, wherein high-voltage networks 5 are frequently connected via DC converters to corresponding low-voltage networks, and therefore a corresponding power exchange can occur there. For this reason as well, in the hybrid motor vehicle 1 according to the invention, an alternator is no longer necessary.

An additional second operating mode provides that the air conditioning compressor 8 is operated both by the electric motor 9 and also by the drive belt 11, which can be advantageous in particular in high-load situations of the air conditioning system 7.

A group of third operating modes is characterized in that the first clutch 10 is open, while the second clutch 12 is closed. In this case, the air conditioning compressor 8 is not operated. Here, substantially two concrete designs of the third operating mode are conceivable. The primary design of the third operating mode is here the operating mode in which the electric motor 9 is operated generatively in order to charge the high-voltage battery 6 of the high-voltage network 5. The second and third operating modes discussed so far are advantageous in particular while the hybrid motor vehicle is stationary, since then the electric drive motor 4 can then not be used in order to charge the high-voltage battery 6 or in general in order to provide power in the high-voltage network 5.

However, an additional advantageous third operating mode, namely a boost operating mode, can also occur during the usual driving operation of the hybrid motor vehicle 1, thus in particular while the hybrid motor vehicle 1 is moving, after which the electric motor 9 can also be used in order to provide torque in motor-driven operation, torque which can be used, via the belt drive 11, for driving the hybrid motor vehicle 1, in particular for brief boosting of the drive power.

Figure 2:
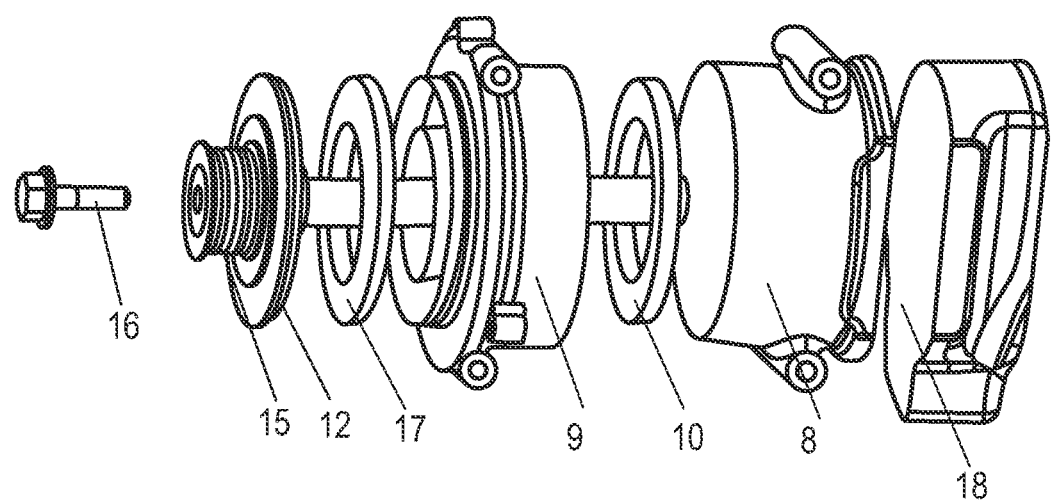
FIG. 2 shows an exploded view of a possible design of the auxiliary unit arrangement.

A concrete design of the auxiliary unit arrangement 13 is represented as an example in the exploded representation of FIG. 2. In addition to the air conditioning compressor 8, the first clutch 10, the electric motor 9, and the second clutch 12, here integrated in the belt pulley 15 of the belt drive 11, FIG. 2 shows, as additional components, a screw 16, an electromagnetic coil 17, and a power electronics unit 18.

The invention claimed is:

1. A hybrid motor vehicle, comprising:
    an internal combustion motor; and
    an electric drive motor;
    at least one air conditioning system with an air conditioning compressor operated by an electric motor, wherein the internal combustion motor and the electric drive motor are configured as drive motors in a powertrain, the electric drive motor and a high-voltage battery associated therewith are connected to a high-voltage network of the hybrid motor vehicle, and the electric motor, forming an auxiliary unit arrangement, is connected via a first clutch to the air conditioning compressor and via a second clutch to a belt drive of the internal combustion motor and can be operated in order to charge the high-voltage battery; and
    a control device is configured to actuate at least one of the clutches as a function of a current operating state of the hybrid motor vehicle.

2. The hybrid motor vehicle according to claim 1, wherein the control device is configured to operate in a plurality of modes:
    a first operating mode, in which the first clutch is closed and the second clutch is open, so that the air conditioning compressor can be operated via the electric motor from the high-voltage network,
    at least one second operating mode, in which the first clutch and the second clutch are closed, so that the air conditioning compressor can be operated by the belt drive, and
    at least one third operating mode, in which the first clutch is open and the second clutch is closed, so that the high-voltage battery can be charged without operation of the air conditioning compressor by the belt drive.

3. The hybrid motor vehicle according to claim 2, wherein the control device is configured to operate in the first operating mode when at least one of the internal combustion motor is not operated and a charging state of the high-voltage battery exceeds a threshold value.

4. The hybrid motor vehicle according to claim 1, wherein, when the first clutch and the second clutch are closed, the control device is configured to simultaneously use energy obtained from the belt drive to charge the high-voltage battery by generative operation of the electric motor and operate the air conditioning compressor.

5. The hybrid motor vehicle according to claim 1, wherein, in a boost operating mode, with a closed second clutch, the control device for motor driven operation of the electric motor is configured to provide a boost torque for driving the hybrid motor vehicle.

6. The hybrid motor vehicle according to claim 1, wherein the control device is configured to actuate the auxiliary unit arrangement as a function of a current operating state of the hybrid motor vehicle.

7. The hybrid motor vehicle according to claim 2, wherein, when the first clutch and the second clutch are closed, the control device is configured to simultaneously use energy obtained from the belt drive to charge the high-voltage battery by generative operation of the electric motor and operate the air conditioning compressor.

8. The hybrid motor vehicle according to claim 3, wherein, when the first clutch and the second clutch are closed, the control device is configured to simultaneously use energy obtained from the belt drive to charge the high-voltage battery by generative operation of the electric motor and operate the air conditioning compressor.

9. The hybrid motor vehicle according to claim 2, wherein, in a boost operating mode, with a closed second clutch, the control device for motor driven operation of the electric motor is configured to provide a boost torque for driving the hybrid motor vehicle.

10. The hybrid motor vehicle according to claim 3, wherein, in a boost operating mode, with a closed second clutch, the control device for motor driven operation of the electric motor is configured to provide a boost torque for driving the hybrid motor vehicle.

11. The hybrid motor vehicle according to claim 4, wherein, in a boost operating mode, with a closed second clutch, the control device for motor driven operation of the electric motor is configured to provide a boost torque for driving the hybrid motor vehicle.

* * * * *